A. G. STOUT.
SPRAYING APPARATUS.
APPLICATION FILED FEB. 11, 1907.
938,084.
Patented Oct. 26, 1909.
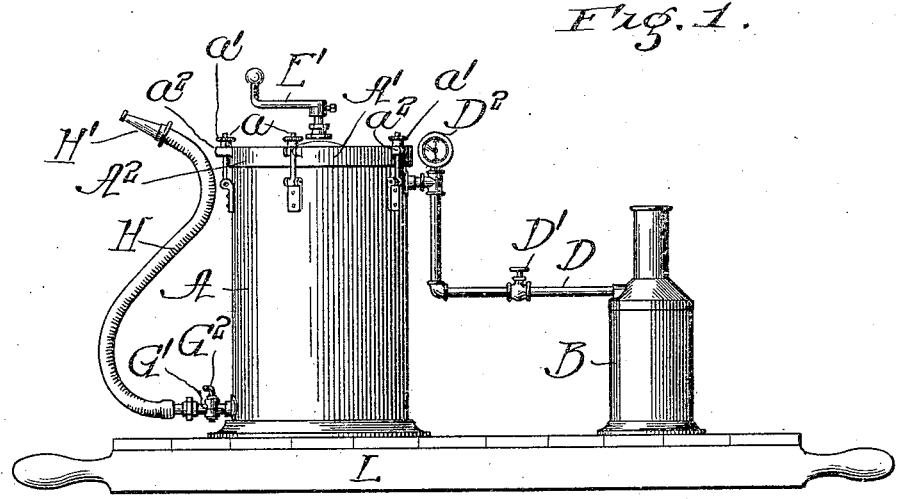
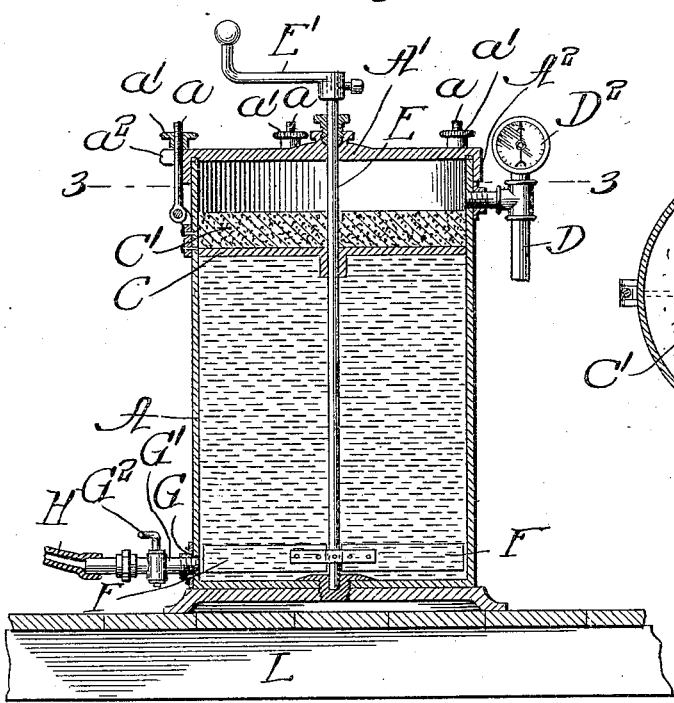
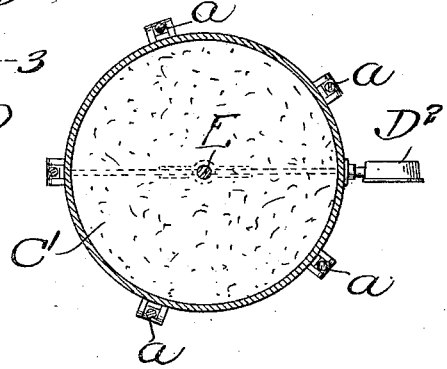
Inventor:
Arthur G. Stout
by Poole & Brown
Attys.

UNITED STATES PATENT OFFICE.

ARTHUR G. STOUT, OF SOUTH HAVEN, MICHIGAN.

SPRAYING APPARATUS.

938,084.    Specification of Letters Patent.    Patented Oct. 26, 1909.

Application filed February 11, 1907. Serial No. 356,834.

*To all whom it may concern:*

Be it known that I, ARTHUR G. STOUT, a citizen of the United States, and a resident of South Haven, in the county of Van Buren and State of Michigan, have invented certain new and useful Improvements in Spraying Apparatus; and I do hereby declare that the following is a full, clear, and exact description thereof, reference being had to the accompanying drawings, and to the letters of reference marked thereon, which form a part of this specification.

This invention relates to spraying devices by which a liquid solution or poisonous liquid sprayed or sprinkled upon plants, trees, shrubs, etc., and it consists in the matters hereinafter set forth and more particularly pointed out in the appended claims.

In the accompanying drawings:—Figure 1 is a side elevation of my spraying apparatus. Fig. 2 is a longitudinal sectional view of the reservoir containing the spraying fluid. Fig. 3 is a vertical section, taken on line 3—3 of Fig. 2.

As shown in the drawings, A indicates a reservoir or tank having the form of an upright cylinder, the lower portion of which contains the fluid to be sprayed and B indicates a steam boiler connected with the upper portion of the tank A, by means of a conduit or pipe D through which steam is conducted from the boiler to the upper interior portion of said tank.

C indicates a vertically movable piston located within the tank A and forming a partition therein between the lower portion of said tank, containing the spraying solution, and the upper portion thereof into which the steam is delivered from the steam boiler. When the upper compartment is filled with steam a pressure is exerted upon the top of the piston C with the result that the said piston is pressed down upon the spraying liquid to force the same from the tank. The said tank A has at its lower part an outlet passage G for the discharge of the spraying fluid therefrom, and a flexible pipe or hose H is connected with said outlet passage and is provided with a spraying nozzle $H^1$.

$G^1$ indicates a pipe which connects the outlet G with the hose H. In said pipe is a valve $G^2$ by which the delivery of the liquid from the tank A can be controlled as desired.

The piston C is provided upon its upper face with an attached disk or layer $C^1$ of asbestos or other material which is a non-conductor of heat. The said non-conducting disk or layer prevents the conveyance of heat from the steam to the solution in the lower part of the tank with which the piston is in contact. The conveyance to the solution of heat from the steam would be objectionable, not only from the heating of the former, but because of the condensation of the steam which would result. Moreover, in the case of some solutions, the latter would be impaired by heating.

$A^1$ indicates a removable circular cap which forms the top wall of the tank A. Said cap $A^1$ is provided with a downwardly extending annular flange $A^2$ which fits closely around the upper margin of the cylindric wall of the tank A, and in practice, a packing will be provided between the parts to render the apparatus air tight at this point. The cap $A^1$ is held in close fitting relation with the cylindric wall of the reservoir by means of a plurality of hinged clamping bolts $a$ $a$, disposed at intervals around the outside walls of the tank which engage outwardly extending notched lugs $a^2$ $a^2$ upon the outside vertical faces of the downwardly extending flange. The bolts are provided with clamping nuts $a^1$ $a^1$ at their upper ends.

E indicates an upright rotative stirrer shaft located centrally in the tank A, provided with a plurality of stirrer blades F F near its lower end and having a hand-crank at its upper end, outside the tank. Said shaft and stirrer blades are adapted for stirring or agitating the spraying liquid or fluid, as is sometimes necessary when a solution of powder and water is used. The said shaft extends through the piston C and cap $A^1$, and the latter is provided with a packing gland to prevent the escape of steam from the reservoir. The pipe D which conducts the steam from the boiler to the tank A is provided with a valve $D^1$ and a gage $D^2$, by means of which the pressure of steam upon the piston C may be controlled as desired.

When it is necessary to fill the tank A with the spraying fluid, the cap $A^1$ will be removed by loosening the screw-nuts $a^1$ $a^1$ and swinging the hinged bolts outwardly to release them from the said cap, and the piston is then lifted out of the reservoir. In removing the piston C, the cap $A^1$ and the piston may be removed from the tank with the agitator shaft, or the crank may be taken from the said shaft and the cap and piston slipped over the upper end of said shaft, leaving the latter in the reservoir.

The tank A and boiler B will preferably be constructed of such size as to make the apparatus portable; the tank and boiler being conveniently supported upon a platform or carrier L having handles at its ends as shown. The boiler may be heated by a burner adapted for using gasolene or the like for fuel, in order that the same may be made of such light weight as to be easily carried in the operation of spraying the plants or vegetables to be treated.

I claim as my invention:—

1. A spraying device comprising a carrier, a cylindric tank mounted on the carrier and having an open upper end, a cap having tight fitting connection with the open end of the tank, means for detachably securing said cap to the tank, a vertically sliding piston within the tank adapted to be removed through the open upper end thereof to permit the insertion of a spraying liquid or solution into the tank below the piston, a discharge pipe of flexible material connected with the bottom of said tank, a steam boiler also mounted on said carrier, and a pipe connected with the boiler and communicating with the interior of the tank at a point above the piston and below the said removable cap, said pipe being provided with a valve by which the passage of steam from the boiler to the tank may be controlled.

2. A spraying device comprising a carrier, a cylinderic tank mounted on the carrier and having an open upper end, a cap having tight fitting connection with the open end of the tank, means for detachably securing said cap to the tank, a vertically sliding piston within the tank adapted to be removed through the open upper end thereof to permit the insertion of a spraying liquid or solution into the tank below the piston, a discharge pipe of flexible material connected with the bottom of said tank, a steam boiler also mounted on said carrier, and a pipe connected with the boiler and communicating with the interior of the tank at a point above the piston and below the said removable cap, said pipe being provided with a valve by which the passage of steam from the boiler to the tank may be controlled, and said piston having upon its upper face a layer of material which is a non-conductor of heat.

In testimony, that I claim the foregoing as my invention I affix my signature in the presence of two witnesses, this 29th day of January A. D. 1907.

ARTHUR G. STOUT.

Witnesses:
FRED C. COGSHALL,
H. C. HEALD.